US012792557B2

(12) United States Patent
Bhamidipati et al.

(10) Patent No.: US 12,792,557 B2
(45) Date of Patent: Nov. 10, 2026

(54) SYSTEM CRASH ANALYSIS MECHANISM

(71) Applicant: NetApp, Inc., San Jose, CA (US)

(72) Inventors: Vedavyas Bhamidipati, Bangalore (IN); Shreyansh Khale, Maharashtra (IN); Raveesh Bhat, Bengaluru (IN); Subhash Mandadi, Telangana (IN); Arun Hiremath, Bengaluru (IN)

(73) Assignee: NetApp, Inc., San Jose, CA (US)

( * ) Notice: Subject to any disclaimer, the term of this patent is extended or adjusted under 35 U.S.C. 154(b) by 29 days.

(21) Appl. No.: 18/898,985

(22) Filed: Sep. 27, 2024

(65) Prior Publication Data

US 2026/0093660 A1 Apr. 2, 2026

(51) Int. Cl.
*G06F 15/173* (2006.01)
*G06F 11/07* (2006.01)

(52) U.S. Cl.
CPC .... *G06F 15/17331* (2013.01); *G06F 11/0778* (2013.01)

(58) Field of Classification Search
CPC ....................... G06F 15/17331; G06F 11/0778
See application file for complete search history.

(56) References Cited

U.S. PATENT DOCUMENTS 10,223,238 B1 * 3/2019 Nash ................... G06F 11/0772
10,469,581 B2 * 11/2019 Amit ....................... G06F 13/28
2004/0093389 A1 * 5/2004 Mohamed ............. H04L 69/329 709/212
2004/0225719 A1 * 11/2004 Kisley ..................... G06F 3/061 709/212
2005/0091212 A1 * 4/2005 Mohamed ............... G06F 16/10 707/999.009
2006/0259570 A1 11/2006 Feng et al.
2007/0186279 A1 * 8/2007 Zimmer ................ G06F 21/305 726/9
2008/0301254 A1 * 12/2008 Bestler .................... H04L 49/90 709/212
2015/0317477 A1 * 11/2015 Piper ................... G06F 11/0709 726/23
2016/0062811 A1 3/2016 Yamada et al.
2018/0307638 A1 * 10/2018 Jin .......................... G06F 13/28
2019/0179794 A1 * 6/2019 Wei ........................ G06F 16/183
2021/0124636 A1 4/2021 Butcher et al.
2023/0138290 A1 5/2023 Ahmed et al.

(Continued)

OTHER PUBLICATIONS

Non-Final Office Action mailed on Jan. 16, 2026 for U.S. Appl. No. 18/898,991, filed Sep. 27, 2024, 15 pages.

*Primary Examiner* — Oleg Survillo
(74) *Attorney, Agent, or Firm* — Jaffery Watson Hamilton & DeSanctis LLP

(57) ABSTRACT

A system is described including one or more processing resources and a non-transitory computer-readable medium, coupled to the processing resource, having stored therein instructions that when executed by the one or more processing resources cause the one or more processing resources to establish a remote direct memory access (RDMA) connection with a client computer system and remotely access a crash dump file stored at the client computer system, including providing a file offset of interest and size of data to be read from the client computer system and translating the file offset of interest and size of data into a plurality of RDMA messages.

20 Claims, 8 Drawing Sheets

(56) References Cited

U.S. PATENT DOCUMENTS

| | | | | |
|---|---|---|---|---|
| 2023/0246931 | A1 | 8/2023 | Chang et al. | |
| 2023/0315683 | A1* | 10/2023 | Luo | G06F 16/13 707/827 |
| 2024/0305637 | A1 | 9/2024 | Horowitz et al. | |
| 2026/0095505 | A1 | 4/2026 | Bhamidipati et al. | |

* cited by examiner

SYSTEM CRASH ANALYSIS MECHANISM

BACKGROUND

A crash dump (or core-dump or dump) file is a file that captures information about a system at the moment of system failure. For example, a crash dump file is created when a system experiences a critical error (e.g., a blue screen of death, kernel panic, hardware malfunction, etc.). The file captures the system's memory state at the time of the crash, including values of kernel variables, system registers, device drivers, and processes running on the system. Crash dump files may be used for postmortem analysis to identify a cause of the crash, which is often related to faulty hardware or memory access violations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
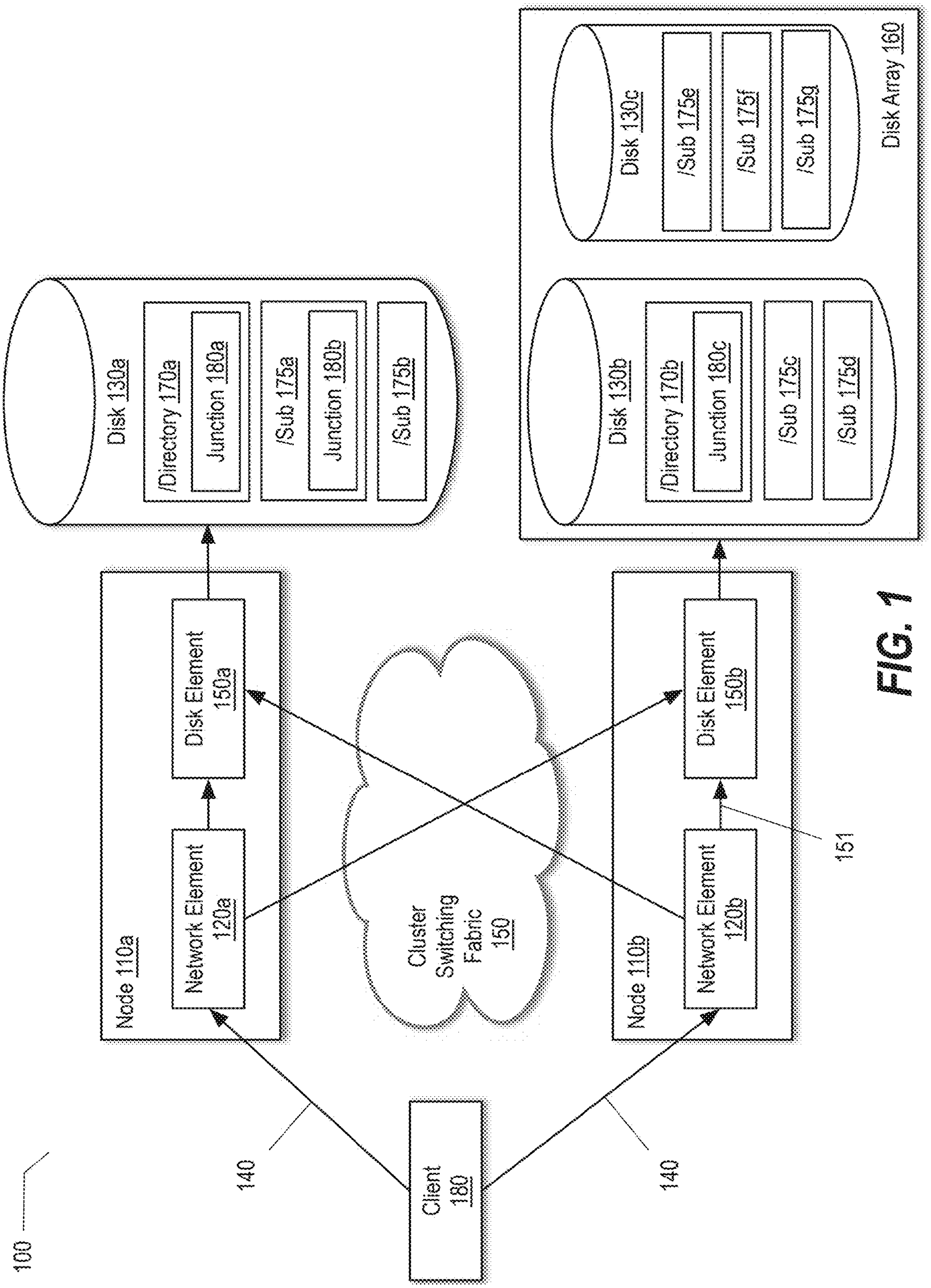
FIG. 1 illustrates one embodiment of block diagram of a plurality of nodes interconnected as a cluster.

Analyzing system or application crashes reported by the customers to resolve unexpected errors or other issues to overcome computing system downtime is an integral aspect a hardware or software provider's product lifecycle. Thus, hardware and software providers must ensure smooth and timely uploads of crash dump files in order to facilitate timely resolution of such customer reported issues. However, storing and retaining incoming crash dump files, archiving the crash dump files to a secondary storage after the retention period and purging the crash dump files may incur significant costs (e.g., time, effort and money) for providers. Specifically, high end hardware platforms have larger random access memory (RAM) sizes that generate larger crash dump file sizes. Moreover, the influx and frequency of crash dump reports increases with the expansion of a provider's customer base, evolving product portfolio and introduction of new hardware platforms.

Further, a delay in acquiring and uploading the crash dump file to a provider's server may further delay the process of crash dump analysis and Root Cause Analysis (RCA), which would in turn may cause increased customer system downtime, thus resulting in further financial loss. Delays in uploading the crash dump files may occur due to issues in the network infrastructure and further due to the large size of the crash dump file itself. For example, a crash dump file of size 726 GB that might have to be uploaded amidst intermittent network issues may take over three days for uploading.

According to one embodiment, a mechanism is provided to remotely analyze crash dump files. In such an embodiment, a remote direct memory access (RDMA) connection is established to access and analyze the crash dump file at a remote computer system. The remote analysis of crash dump files precludes having to upload the actual files to a provider's server.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element 310 and a disk element 350. The network element 310 includes functionality that enables the node 200 to connect to one or more clients 180 over a computer network 140, while each disk element 350 connects to one or more storage devices, such as disks 130 of a disk array 120. The nodes 200 are interconnected by a cluster switching fabric 150 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node 200 comprising one network elements and one disk element should be taken as illustrative only.

Clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements 350 are illustratively connected to disks 130, that may be organized into disk arrays 120. Alternatively, storage devices other than disks may be utilized, e.g., flash memory, optical storage, solid state devices, etc. As such, the description of disks should be taken as exemplary only. As described below, in reference to FIG. 3, a file system 360 may implement a plurality of flexible volumes on the disks 130. Flexible volumes may comprise a plurality of directories 170 A, B and a plurality of subdirectories 175 A-G. Junctions 190 A-C may be located in directories 170 and/or subdirectories 175. It should be noted that the distribution of directories 170, subdirectories 175 and junctions 190 shown in FIG. 1 is for illustrative purposes. As such, the description of the directory structure relating to subdirectories and/or junctions should be taken as exemplary only.

Storage System Node

Figure 2:
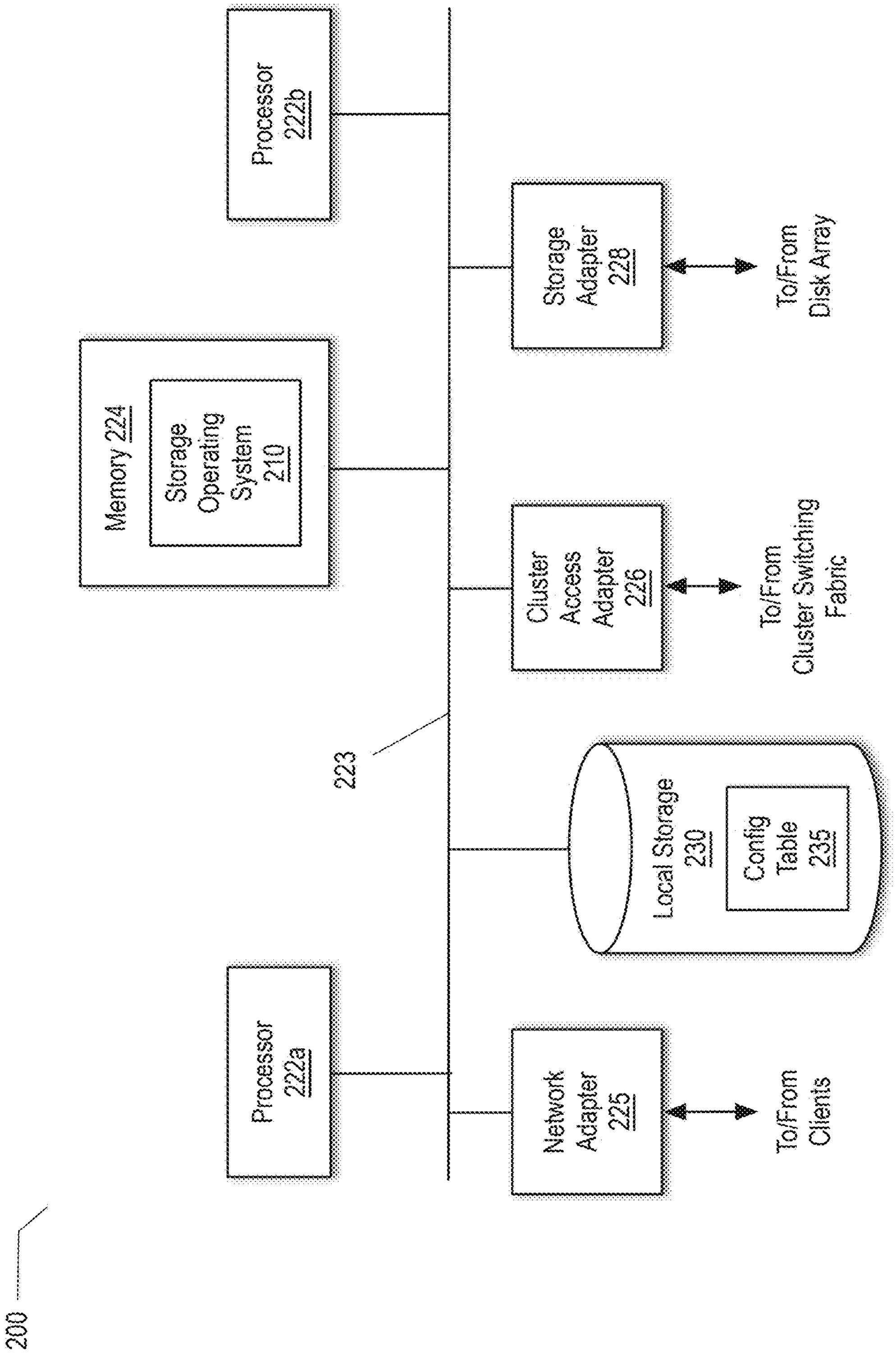
FIG. 2 illustrates one embodiment of a block diagram of a node.

FIG. 2 is a schematic block diagram of a node 200 that is illustratively embodied as a storage system comprising a plurality of processing resources (e.g., processors) 222 *a* and *b*, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222 *a* executes the functions of the network element 310 on the node, while the other processor 222 *b* executes the functions of the disk element 350.

The memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described herein, the information is stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Illustratively, the storage operating system is preferably the Data ONTAP® operating system available from NetApp™, Inc., San Jose, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Figure 3:
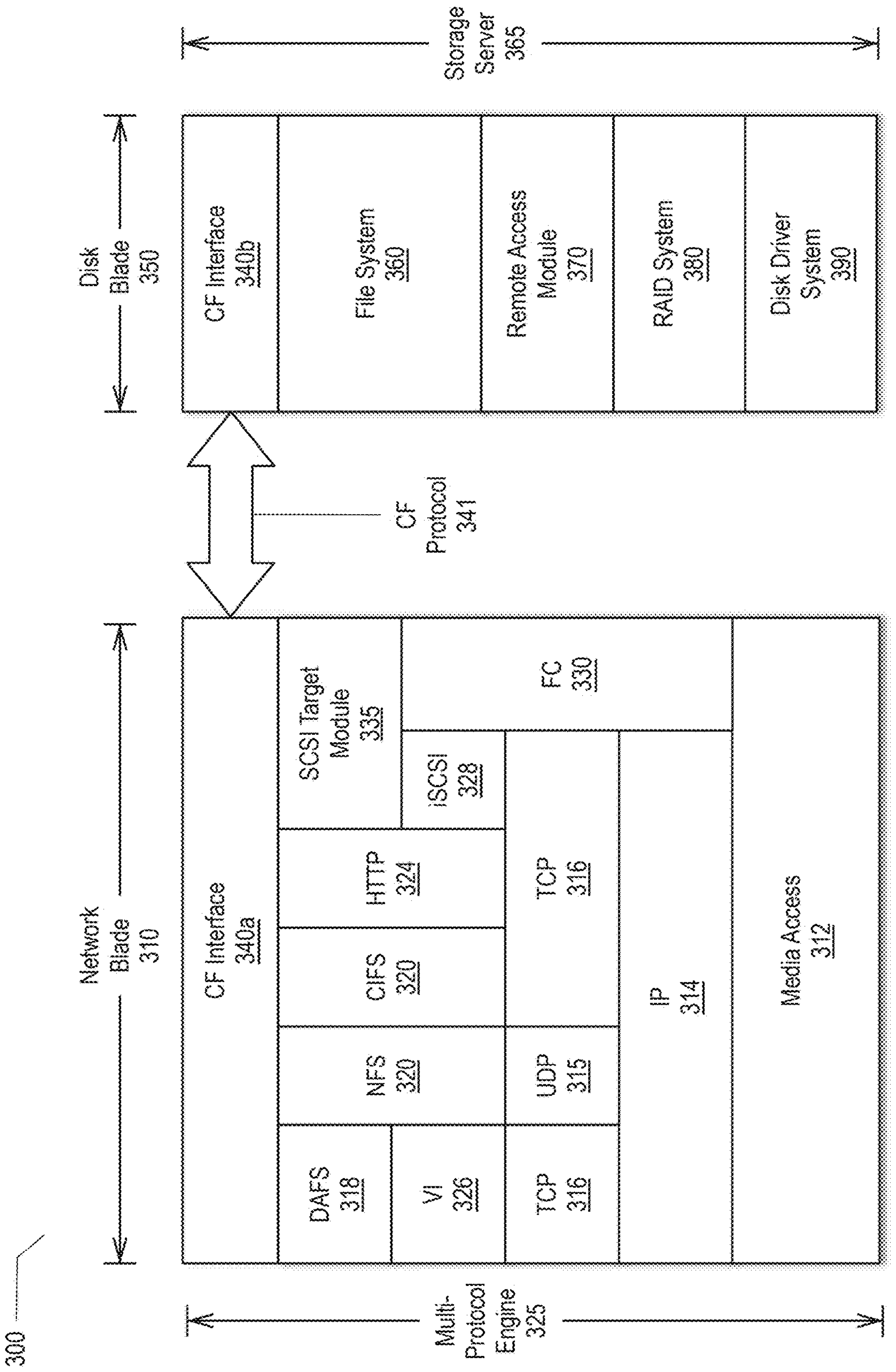
FIG. 3 illustrates one embodiment of a block diagram of a storage operating system.

FIG. 3 is a schematic block diagram of the storage operating system 300 that may be advantageously used with the subject matter. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk, dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Crash Dump Organization

In one embodiment, each client 180 may generate crash dump files in instances in which storage operating system 300 errors occur. As discussed above, conventional provider systems must access a crashed system (e.g., client 180) in order to upload the crash dump file to a provider's server, which potentially results in the above-mentioned overhead costs.

Figure 4:
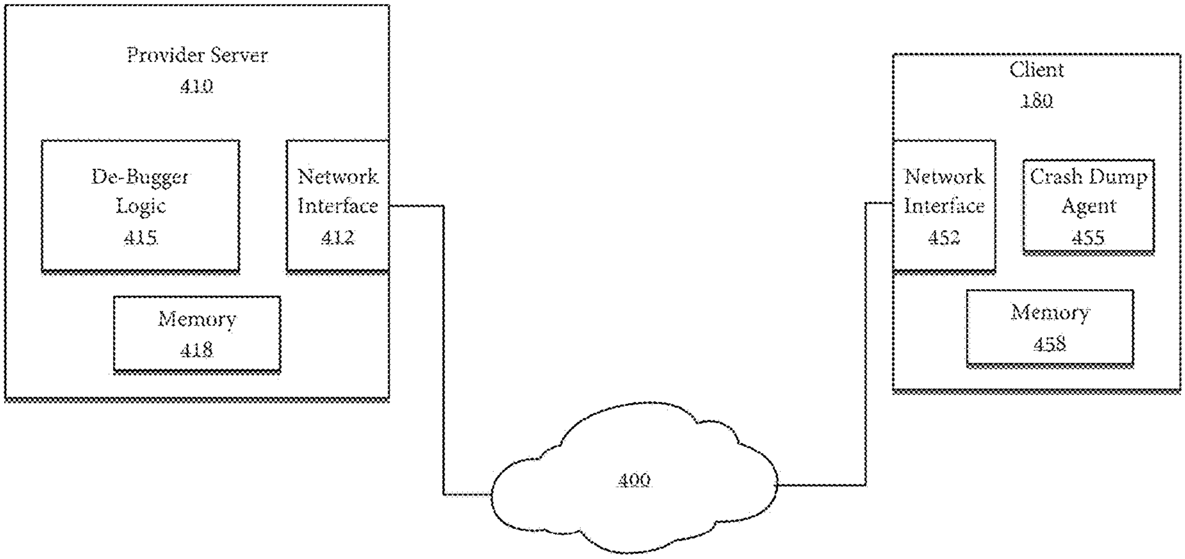
FIG. 4 is a block diagram illustrating one embodiment of a provider server coupled to client.

FIG. 4 is a block diagram illustrating one embodiment of a provider server 410 coupled to client 180. As shown in FIG. 4, provider server 410 and client 180 include network interfaces 412 and 452 to couple via a network 400. Provider server 410 includes a network interface 412 to communicate with client 160 via a network interface 452. In embodiments, network interface 412 and network interface 452 comprise network interface cards (NICs) that enable the data transfers between server 410 and client 180. Provider server 410 also includes debugger logic 415 that is implemented to process crash dump files. Debugger logic 415 comprises a portable debugger that enables debugging of remote computing systems, such as client 180. In one embodiment, debugger logic 415 comprises a GNU Debugger (GDB). However in other embodiments debugger logic 415 may be implemented using other types of debugger applications.

Figure 5:
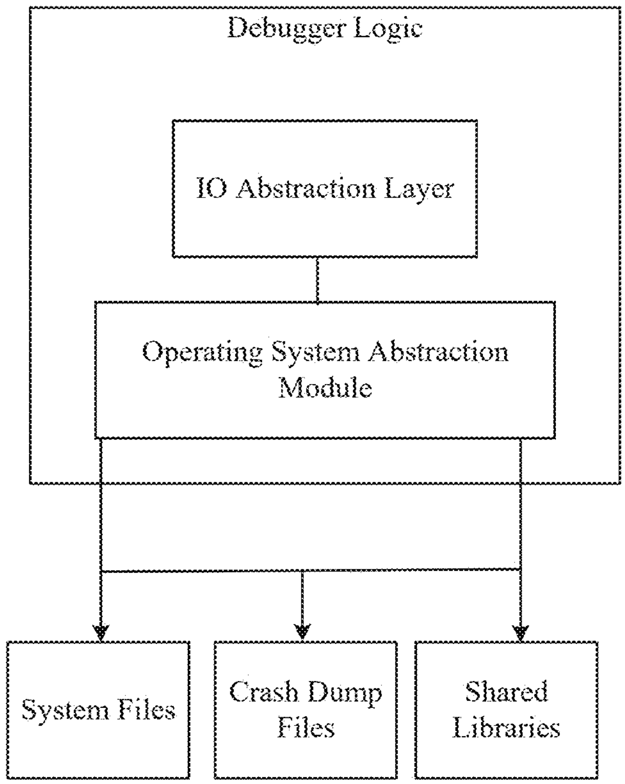
FIG. 5 illustrates conventional debugger logic.

FIG. 5 illustrate one embodiment of conventional debugger logic including an input/output (IO) abstraction layer implemented to perform local reads, and sometimes writes, to a crash dump file at client 180. The IO abstraction layer provides abstraction and hides details from higher layers in the debugger logic regarding accessing of core dumps. The IO abstraction layer supports various executable and symbol table formats. The IO abstraction layer and operating system abstraction module provide access to key files required to debugging causes for a crash or panic. As shown in FIG. 5, the key files needed in debugging include the crash dump file, symbol table file, and shared libraries. Thus, local access of a crash dump file results in the crash dump file, symbol table file, and shared libraries having to be accessed via the same interface.

Figure 6:
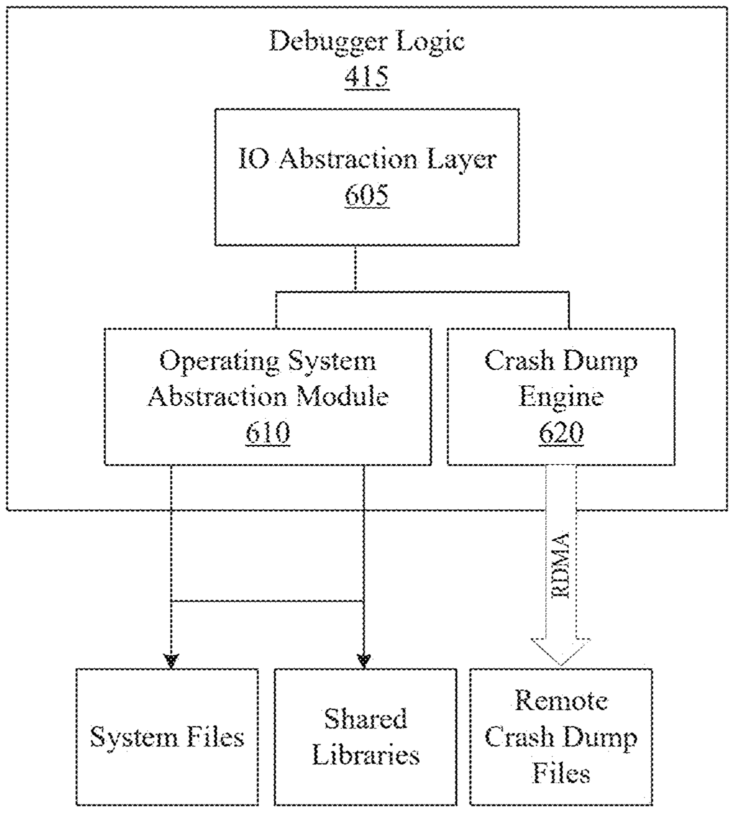
FIG. 6 illustrates one embodiment of debugger logic.

FIG. 6 illustrates one embodiment of debugger logic 415 including a crash dump engine 620 that facilitates establishing a RDMA connection between IO abstraction layer 605 and a crash dump agent 455 at client 180 (FIG. 4) to remotely analyze crash dump files stored at client 180 via memory mapping. In one embodiment, crash dump engine 620 comprises a debugger upper level protocol (ULP) that enables replacing the local crash dump file reads performed in the conventional debugger logic described above in FIG. 5 with remote RDMA reads of crash dump files located remotely at client 180. In this embodiment, only IO abstraction layer 605 is aware of the crash dump engine 620. RDMA communication between server 410 and client 180 ensures that RDMA enabled network interface 452 directly writes into an application buffer of debugger logic 415 via a RDMA enabled network interface 412.

In a further embodiment, operating system abstraction module 610 is only implemented to access system files and shared libraries since the crash dump files are accessed via RDMA. Thus, the RDMA communication bypasses operating system abstraction module 610, which eliminates the penalty of switching between contexts from a user-mode to a kernel mode. In yet a further embodiment, an application buffer in memory 418 in provider server 410 is registered with network interface 412 (e.g., at the time of initialization), which subsequently reads from or writes into that buffer for the lifetime of the application. This results in the elimination of buffer copy and context switching overheads.

According to one embodiment, crash dump engine 620 and crash dump agent 455 are created using an InfiniBand verbs (IB-verbs) RDMA library and are compatible with any RDMA capable network interface. In such an embodiment, the RDMA link type comprises Software-iWARP(siw). In a further embodiment, crash dump engine 620 and crash dump agent 455 directly interfaces with their respective drivers via an IB-verbs library, thus enabling OS bypass regardless of usage Software-iWARP or network to support RDMA stack. The siw-driver is configured to present a pseudo RDMA network interface to the application to enable the network interface to perform control tasks (e.g., besides IO, such as registering its memory region (MR)). In embodiments, the MR corresponds to the application buffer. Registration of the MR with the NIC ensures the following: 1) The buffer is pinned to the memory, thus ensuring that the buffer is not swapped out as long as it is in use; 2) Virtual Address (VA) mapping with the Physical Address (PA) remains undisturbed; and 3) The network interface is provided necessary permissions to read or write into the registered MR.

Figure 7:
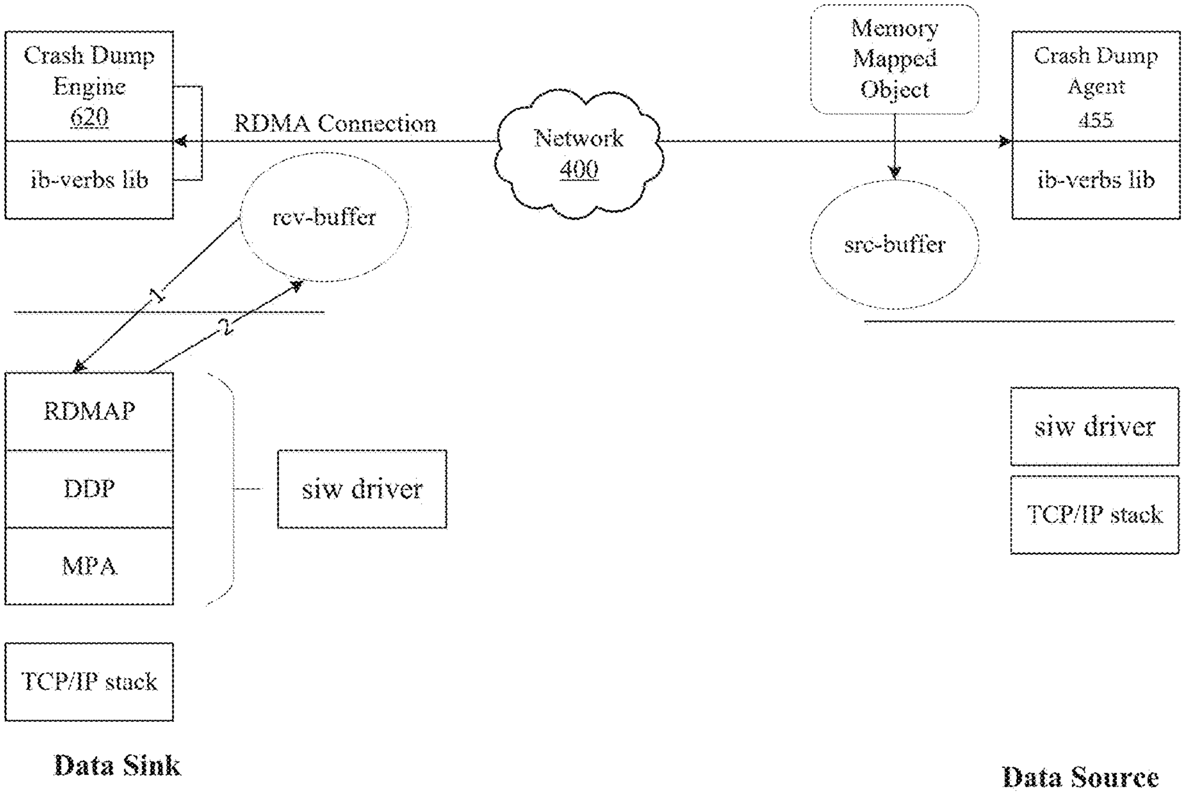
FIG. 7 is a sequence diagram illustrating one embodiment of a RDMA transaction.

FIG. 7 illustrates is a sequence diagram illustrating one embodiment of a RDMA transaction. Server 410 shares the MR that corresponds to its buffer with client 180 once an RDMA connection has been established (e.g., via crash dump engine 620 and crash dump agent 455, respectively). Subsequently, network interface 458 at client 180 performs a RDMA write (RDMA-WRITE) into the shared MR. In one embodiment, sharing of the MR by server 410 is performed using a control message (SHARE-MR).

Further, IO abstraction layer 605 supplies parameters to crash dump engine 620, including: 1) file offset of interest; and 2) size of the data to be read. In one embodiment, crash dump engine 620 translates the parameters into RDMA messages, including: 1) 'Send-msg' from server 410 (e.g., instructing client 180 regarding the offset & size of the data); 2) client 180 populates a source buffer (src-buffer) with the requested data and initiates an RDMA-WRITE transaction upon receiving the offset & size. This results in the writing of the requested data into the application buffer at server 410; 3) a Write Completed (WRITE COMPLETED) message is transmitted to client 180 upon completion of a successful RDMA. In one embodiment, the communication between server 410 and client 180 comprises an exchange of control messages and RDMA-WRITE transactions.

Figure 8:
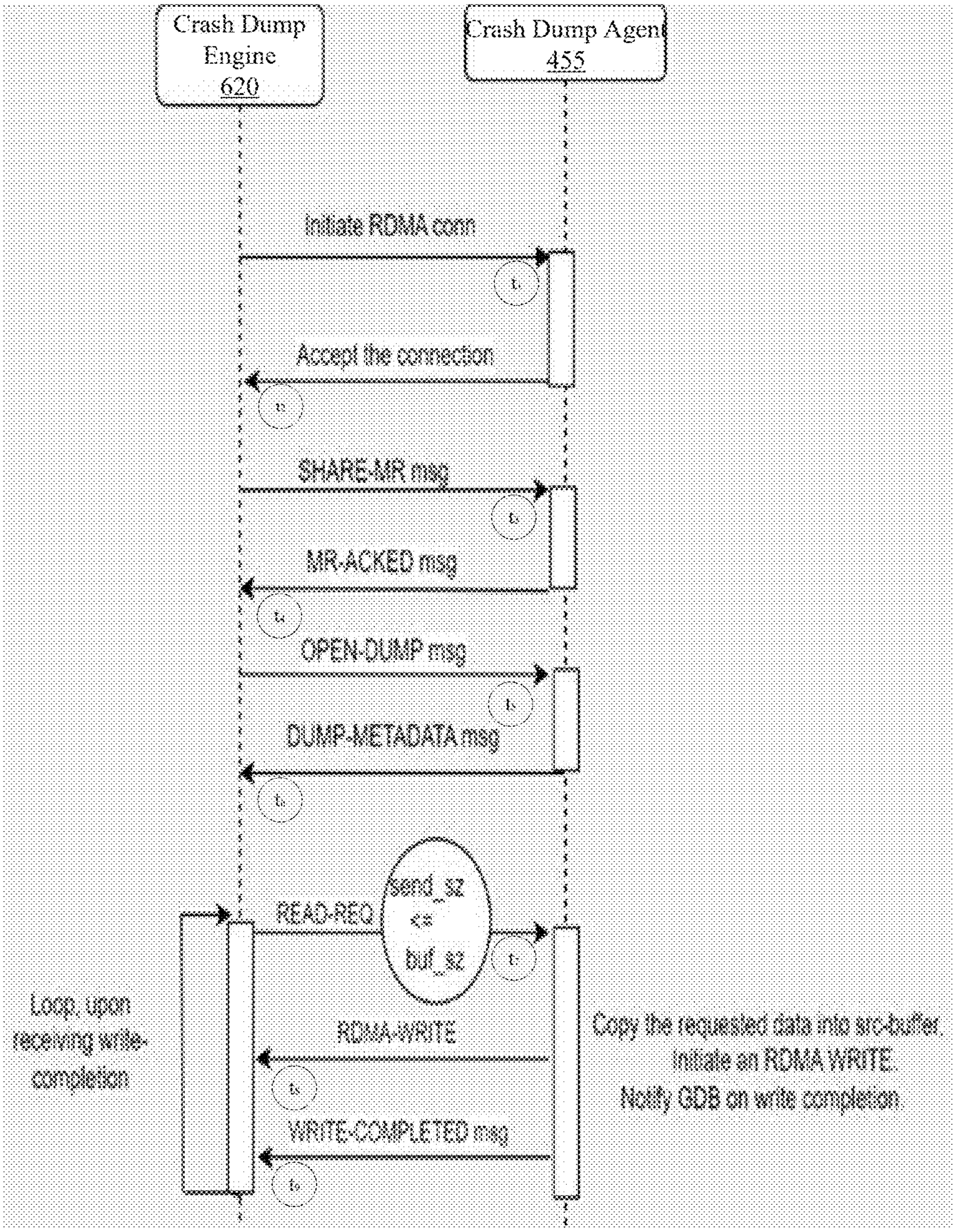
FIG. 8 is a sequence diagram illustrating another embodiment of a RDMA transaction.

FIG. 8 is a sequence diagram illustrating more detailed embodiment of an RDMA connection between server 410 and client 180. As shown in FIG. 8, the process begins at $t_1$ with crash dump engine 620 initiating a RDMA connection. Subsequently, at $t_2$ crash dump agent 455 accepts the connection. At $t_3$, crash dump engine 620 transmits the SHARE-MR message, followed by an acknowledge message (MR_ACKED) being received from crash dump agent 455, $t_4$. Crash dump agent 455 then transmits an 'OPEN-DUMP' message to crash dump agent 455, $t_5$. The OPEN-DUMP message instructs client 180 to open a crash-dump file of interest. Subsequently, client 180 may open a file. In one embodiment, the file is opened by mapping the file into the memory. However in other embodiments the file may be opened by using an "fopen call" (file IO system service).

Upon receiving the OPEN-DUMP message, crash dump agent 455 transmits DUMP-METADATA to crash dump engine 620, at $t_6$, which includes metadata details (e.g., file size). In one embodiment, debugger logic 415 maintains an internal structure ("struct objfile") that represents the crash dump file being analyzed. In such an embodiment, populating the fields of "struct objfile" ensures that the details from 'DUMP-METADATA' are used. At $t_7$, crash dump engine 620 transmits a read request (READ_REQ). Upon receiving the READ_REQ crash dump agent 455 determines whether the allocated IO buffers (rcv-buffer and src-buffer) are adequate to hold the requested data (send_sz<=buf_sz).

Crash dump agent 455 copies the requested data into src-buffer and initiates a RDMA-WRITE upon a determination that the IO buffers are adequate, $t_8$. At $t_9$, a WRITE-COMPLETED message is transmitted from crash dump agent 455 to crash dump engine 620 upon completion of the RDMA-WRITE. Upon a determination that the IO buffers are inadequate, buffer resizing is performed at server 410 and client 180. This results in buffer resizing happens at both server 410 and client 180. In one embodiment, crash dump engine 620 determines that the available rcv-buffer is too small for the read request that is to be transmitted and re-sizing of the buffer is needed. In such an embodiment, resizing of only the rcv-buffer may be insufficient since the src-buffer may need to resized accordingly. Thus, crash dump engine 620 communicates a new buffer size to client 180 to ensure that the buffers on both the ends are resized concurrently. Subsequently, the RDMA-WRITE may be performed. Subsequent READ_REQ are transmitted from the crash dump engine 620 to crash dump agent 455.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:

initiating a remote direct memory access (RDMA) connection with a client computer system;

receiving a plurality of parameters associated with a crash dump file to access a file at the client computer system;

translating the plurality of parameters into one or more RDMA messages; and transmitting the one or more RDMA messages to the client computer system via the RDMA connection, wherein the parameters comprise a file offset and size of data to be read.

2. The method of claim 1, wherein the plurality of RDMA messages comprises a read request transmitted to the client computer system.

3. The method of claim 2, wherein the plurality of RDMA messages further comprises a RDMA write message received from the client computer system.

4. The method of claim 3, wherein the RDMA write message comprises crash dump file data from a source buffer at the client computer system.

5. The method of claim 3, wherein the plurality of RDMA messages further comprises a write completed message received from the client computer system indicating completion of the RDMA.

6. The method of claim 1, wherein accessing the crash dump file further comprises transmitting an open dump message indicating a crash-dump file of interest that is to be received.

7. The method of claim 6, wherein accessing the crash dump file further comprises receiving dump metadata associated with the crash-dump file of interest.

8. A system comprising:

one or more processing resources; and a non-transitory computer-readable medium, coupled to the processing resource, having stored therein instructions that when executed by the one or more processing resources cause the one or more processing resources to initiate a remote direct memory access (RDMA) connection with a client computer system, receive a plurality of parameters associated with a crash dump file to access a file at the client computer system, translate the plurality of parameters into one or more RDMA messages and transmit the one or more RDMA messages to the client computer system via the RDMA connection, wherein the parameters comprise a file offset and size of data to be read.

9. The system of claim 8, wherein the plurality of RDMA messages comprises a read request transmitted to the client computer system.

10. The system of claim 9, wherein the plurality of RDMA messages further comprises a RDMA write message received from the client computer system.

11. The system of claim 10, wherein the RDMA write message comprises crash dump file data from a source buffer at the client computer system.

12. The system of claim 10, wherein the plurality of RDMA messages further comprises a write completed message received from the client computer system indicating completion of the RDMA.

13. The system of claim 8, wherein accessing the crash dump file further comprises transmitting an open dump message indicating a crash-dump file of interest that is to be received.

14. The system of claim 13, wherein accessing the crash dump file further comprises receiving dump metadata associated with the crash-dump file of interest.

15. A non-transitory computer-readable storage medium embodying a set of instructions, which when executed by a processing resource cause the processing resource to:

initiate a remote direct memory access (RDMA) connection with a client computer system;

receive a plurality of parameters associated with a crash dump file to access a file at the client computer system;

translate the plurality of parameters into one or more RDMA messages; and transmit the one or more RDMA messages to the client computer system via the RDMA connection, wherein the parameters comprise a file offset and size of data to be read.

16. The computer-readable storage medium of claim 15, wherein the plurality of RDMA messages comprises a read request transmitted to the client computer system.

17. The computer-readable storage medium of claim 16, wherein the plurality of RDMA messages further comprises a RDMA write message received from the client computer system.

18. The computer-readable storage medium of claim 17, wherein the RDMA write message comprises crash dump file data from a source buffer at the client computer system.

19. The computer-readable storage medium of claim 17, wherein the plurality of RDMA messages further comprises a write completed message received from the client computer system indicating completion of the RDMA.

20. The computer-readable storage medium of claim 15, wherein accessing the crash dump file further comprises:

transmitting an open dump message indicating a crash-dump file of interest that is to be received; and receiving dump metadata associated with the crash-dump file of interest.

* * * * *